F. G. COTTRELL & H. A. BURNS.
APPARATUS FOR SEPARATING SUSPENDED PARTICLES FROM GASEOUS BODIES.
APPLICATION FILED SEPT. 9, 1909. RENEWED JAN. 29, 1912.
1,035,422.
Patented Aug. 13, 1912
2 SHEETS—SHEET 1.
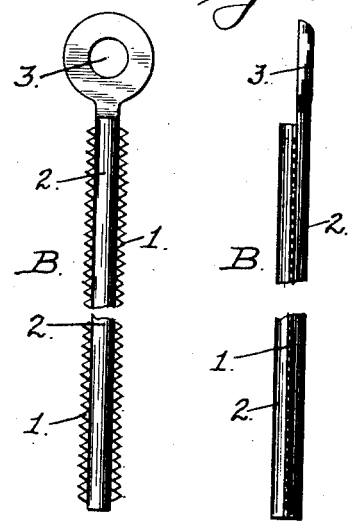
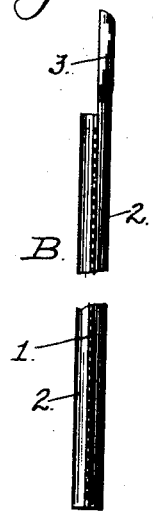
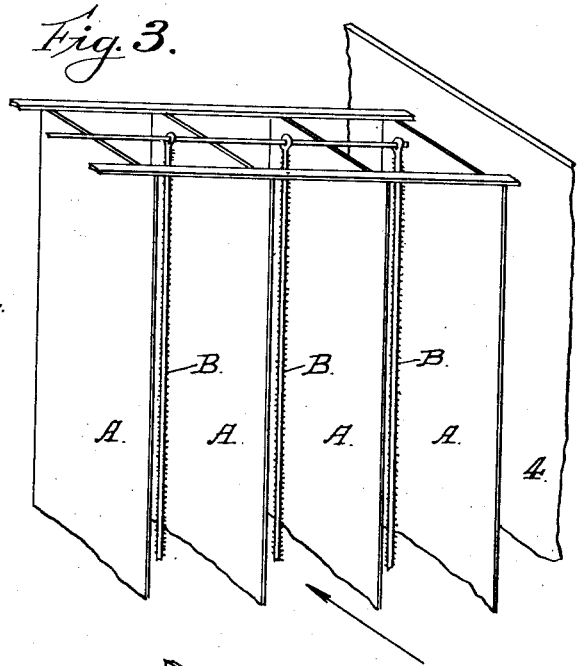
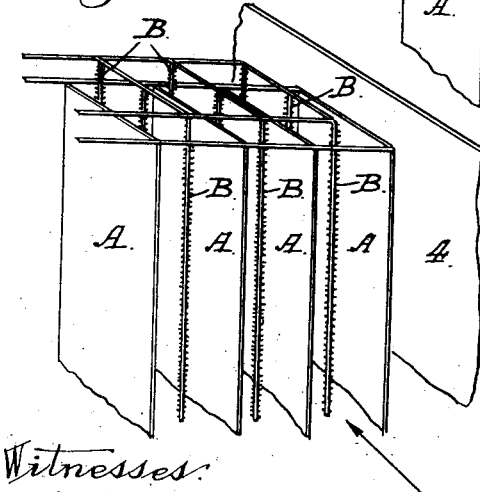
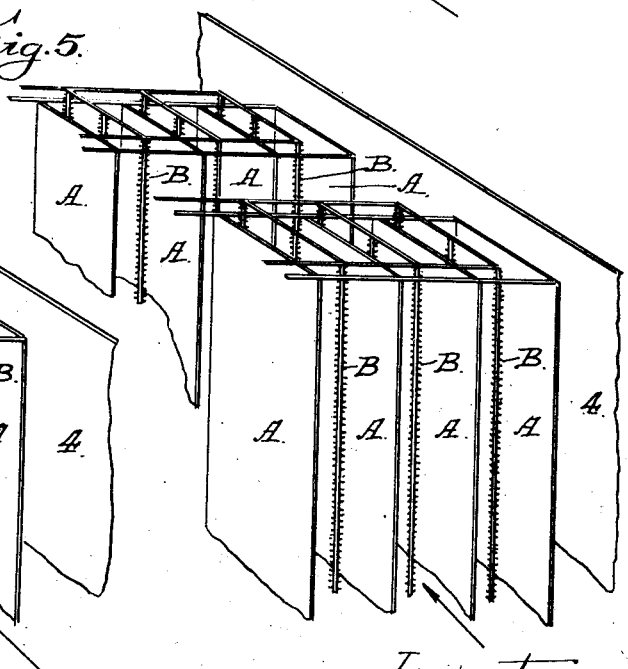
Witnesses:
Arthur L. Slee
S. Constuie
Inventors.
Frederick Gardner Cottrell
and Herbert Alexander Burns
by Wm. F. Booth
Their Attorney.

F. G. COTTRELL & H. A. BURNS.
APPARATUS FOR SEPARATING SUSPENDED PARTICLES FROM GASEOUS BODIES.
APPLICATION FILED SEPT. 9, 1909. RENEWED JAN. 29, 1912.
1,035,422.
Patented Aug. 13, 1912.
2 SHEETS—SHEET 2.
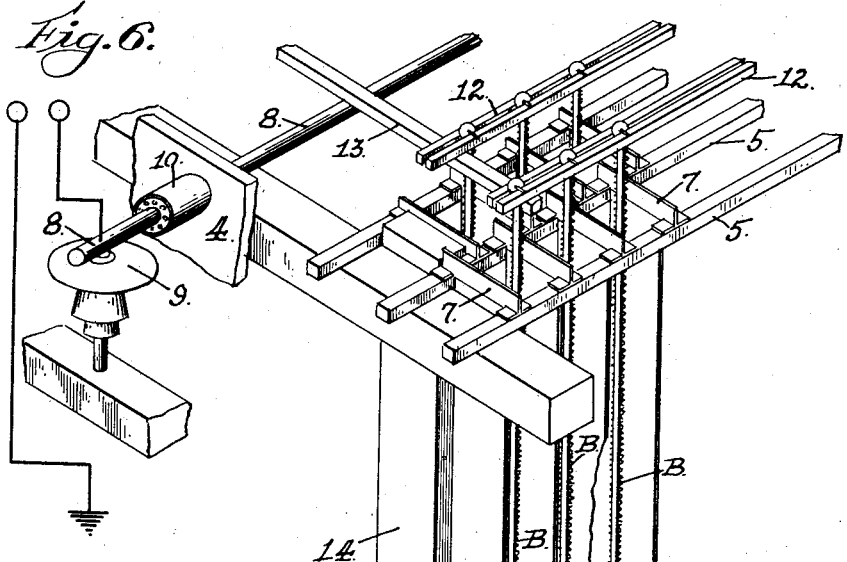
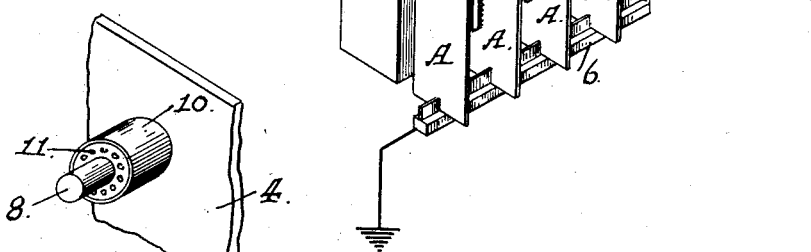
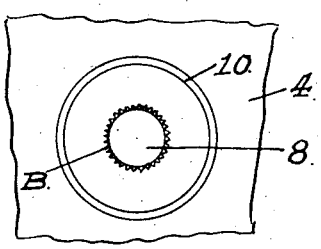
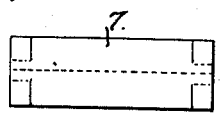
Witnesses:
Arthur P. Slee.
S. Constine.
Inventors.
Frederick Gardner Cottrell
and Herbert Alexander Burns
by Wm. F. Booth
Their Attorney.

UNITED STATES PATENT OFFICE.

FREDERICK GARDNER COTTRELL, OF BERKELEY, AND HERBERT ALEXANDER BURNS, OF OAKLAND, CALIFORNIA, ASSIGNORS TO INTERNATIONAL PRECIPITATING COMPANY, OF SAN FRANCISCO, CALIFORNIA, A CORPORATION OF CALIFORNIA.

APPARATUS FOR SEPARATING SUSPENDED PARTICLES FROM GASEOUS BODIES.

1,035,422. Specification of Letters Patent. Patented Aug. 13, 1912.

Application filed September 9, 1909, Serial No. 516,951. Renewed January 29, 1912. Serial No. 674,199.

*To all whom it may concern:*

Be it known that we, FREDERICK GARDNER COTTRELL and HERBERT ALEXANDER BURNS, citizens of the United States, residing the said COTTRELL at Berkeley, in the county of Alameda and State of California, and the said BURNS at Oakland, Alameda county, California, have invented certain new and useful Improvements in Apparatus for Separating Suspended Particles from Gaseous Bodies, of which the following is a specification.

Our invention relates to the class of apparatus for separating suspended particles from gaseous bodies by the application of electric charges; and it consists in the novel structure and arrangement of the electrodes, together with their supports and insulation, which we shall hereinafter fully describe and claim.

It is well known that the particles of a gaseous body tend to deposit from the latter when the gaseous body is brought within the field produced by the juxtaposition of two bodies charged to a high electric potential relatively to each other.

The term "gaseous body" as above and hereinafter used is to be understood as including all gases or vapors together with any solid or liquid particles held in suspension therein. It is also well known that such deposition of suspended particles from gaseous bodies is facilitated if the terminal bodies of the electric field, in which the gaseous body is inclosed, are of the nature of sharp points, sharp edges, fine hairs or other similar bodies of very small electric discharge surface. This is particularly noticeable if the terminal bodies have pubescent surfaces. Such bodies holding, in any form, sharp points, sharp edges, fine hairs, pubescent surfaces, or other very small electric discharge surfaces, will be briefly referred to hereinafter as "discharge electrodes," in contradistinction to "collecting electrodes," as defined below, where such bodies are designed for terminals of an electric field.

When the two terminal electrodes of an electric field are, the one a "discharge electrode" and the other an electrode of smooth surface, relatively large in area compared to the discharge surface of the discharge electrode, the suspended particles tend to deposit mainly upon the smooth electrode. This is especially noticeable where the field is of "essentially constant polarity," which latter term, is to be understood to include such alternating fields as have a higher voltage during the alternations of one sign than during those of opposite sign, or such reversals as are sufficiently infrequent to not interfere with the deposition of individual particles of the gaseous body.

The above described "smooth terminal" may be conveniently called a "collecting electrode" and this term will be so used herein.

One great difficulty experienced in applying on a commercial scale this method of separating suspended particles from gaseous bodies, has been that of finding a suitable "discharge electrode"; and further difficulties have been met in so arranging and supporting the electrode system, as to secure a uniform, rapid, and complete separation of suspended particles from gases moving with considerable velocity through a flue or chamber. To the overcoming of these difficulties the following improvements are directed. A commercially practical discharge electrode should present to the gas a great extent of the finest possible points or edges. Furthermore it must be highly resistant to any deteriorating action of the gaseous body, as through chemical action of any of the constituents of the gaseous body, or high temperature of the latter. The materials comprising the electrode, too, must be sufficiently non-inflammable, as well as heat resistant; that any occasional arcing or sparking between the electrodes, does not injure them. The electrode must necessarily be a sufficiently good conductor for the electric charge imposed upon it, and must be strong and rigid enough to allow its support in such wise that its required electrical insulation may be maintained without difficulty. For a discharge material or element of such an electrode, we have found that sheet mica, either in its natural form, or as manufactured into its various products, such as micanite, micabestos, etc., serves efficiently, and is eminently suitable for the purpose, Hereinafter, for convenience, all such forms of sheet mica, natural or manufactured into such products as micanite, micabestos, etc., will be referred to as "mica" and where "mica" is used, it is to be understood, as including all such forms, the term composite mica indicating such above mentioned manufactured forms.

The laminated structure of "mica" permits the opposing of a sharp, extremely thin edge to a "collecting electrode," in such manner that a strong electric discharge may occur from the mica edge. It has, also, the qualifications, that it is extremely resistant to ordinary chemicals, is not affected by moderately high temperatures, is non-inflammable, and is not materially affected by such occasional disruptive discharges as may occur between the electrodes. This permits its use in commercial plants, such as smelters, etc., where the gaseous bodies to be treated have such constituents as sulfuric acid, highly deteriorating to most available discharge materials, or where it may be desired to treat the gaseous body at high temperatures. Being in itself a non-conductor of electric charges with too little surface leakage for a sufficient conductance of such charges over a great length, and being also insufficiently strong and rigid to support itself properly as an electrode, we have adopted the device of clamping the mica sheets between supporting structures which are electrical conductors in such manner that the relatively narrow protruding mica edges may be sufficiently charged through surface leakage over the mica from the charges imposed upon the supporting structure.

Where considerable mica edge is to be opposed to a corresponding length of surface of a collecting electrode with uniform free gas space, as a rule, the mica will be made into convenient strips and clamped between rods or bars, but such forms it is to be un-understood, are determined by the existing conditions.

If the mica edge, in the above described discharge electrode be serrated, so that a series of pointed edges of the mica replace the continuous edge, the efficiency of the electrode is increased. When manufactured forms of mica as micanite, micabestos, etc., are used, the efficiency of the electrode is increased, if, after clamping the mica between its supports, the cementing substance of the protruding edges is burned away or otherwise removed from between the layers. By this means the finer laminæ of the mica are separated from one another, allowing each lamina to have its discharge effect with less interference from charges upon adjacent laminæ.

Referring now to the accompanying drawings:—Figure 1 is a face elevation of one form of a discharge electrode. Fig. 2 is an edge view of the same. Fig. 3 is a view showing the assemblage, in one form, of the discharge electrodes and the collecting electrodes. Fig. 4 is a view showing another form of assembling them. Fig. 5 is a view showing a third form of assemblage. Fig. 6 is a view showing still another form, together with features of support and insulation. Fig. 7 is a detail of an insulation. Fig. 8 is a further detail of insulation. Fig. 9 is a view of the blank from which the top supports or hangers for the collecting electrodes may be formed.

Considering first, Figs. 1 and 2, the discharge electrode which we designate generally by B, is composed of the mica strip 1, clamped between two half round iron rods 2, one of which has formed at its top an eye 3 by which the electrode is suspended, and the other terminates short and has its top squared as seen in Fig. 2, to form a stop against the support from which the electrode is hung. The mica sheet 1, protrudes from the rods 2 and has its edges finely serrated. When this electrode is to be used in a flue in which $H_2SO_4$ is the chief chemical constituent from which the electrode is to be protected, the iron rods 2 may be protected by lead, the iron being for rigidity and the lead coating for chemical protection from the sulfuric acid. In practical treatment of gaseous bodies passing through flues or chambers, the usual method employed is to arrange the electrodes in the flue or chamber so that the general direction of the force of the fields excited is at right angles to the direction of flow of the gas. Thus, in Fig. 3, the arrow shows the direction of flow of the gas through the flue 4. A are the collecting electrodes and B the discharge electrodes, for exciting the fields through which the gas must flow.

When the velocity of the gaseous body under treatment is high, and one set of electrodes, as in Fig. 3 is not sufficient to remove all the suspended particles from the gaseous body, the arrangement shown in Fig. 4, wherein several discharge electrodes B are supported between wide collecting electrodes A so that several successive electric fields may be excited in a direction at right angles to the flow of the gaseous body, will often accomplish the desired effect. In practice, however, the number of discharge electrodes to be so placed between the collecting electrodes is limited by mechanical difficulties, and for the higher velocities, an arrangement as shown in Fig. 5, has proven more satisfactory. In this arrangement several sets or rows of electrodes A and B are placed in series. The number of such successive sets is limited only by the length of flue or chamber available for the purpose. We have also found that if the electrodes are arranged as in Fig. 4, the field first acting upon the gaseous body or portion thereof, is more efficient than succeeding fields; that is, where several discharge electrodes are successively placed between two parallel collecting electrodes, the several fields established when the electrodes are charged, are not equally efficient in cleaning the gas flowing through them, the field first acting upon the gas being more effective than any of the succeeding fields. We have further determined that when the electrodes are arranged as in Fig. 6, successive fields are more nearly if not quite equal in efficiency to that of the fields first acting upon the gaseous body. Such an arrangement of terminals as is indicated in Fig. 6, will be hereinafter referred to as "staggered." A "staggered" system may be described as follows:—When a series of fields are established across the path of a gaseous body, in such wise that the gaseous body is successively acted upon by each field, the field electrodes are "staggered" if in the general direction of flow of the gaseous body, they are laterally displaced with respect to the electrodes of their own type, which immediately precede them in the electrode system.

In Fig. 6 is shown, in detail, one type of "staggered" system of electrodes, designed for removing suspended particles from gaseous bodies, flowing through horizontal flues or chambers. The collecting electrodes A are suspended parallel to the direction of flow of gaseous body, from supports 5 which may be of any structural material adapted for this purpose. These supports 5 may be held in various ways dependent upon the conditions met with in the structure of the flue or chamber. At the bottom end of the collecting electrodes, a guide 6 serves to prevent swinging of the plates. At their top ends the collecting electrodes terminate in hangers 7, which, opposite the discharge electrode B, should be, at most, but little thicker than the collecting electrode in order not to reduce the free gas spacing between the electrodes. The form shown is made of thinnest metal consistent with the weight to be supported and consists of an oblong strip of metal, as shown in Fig. 9, doubled along the center of the strip, and cut near the corners which are turned up as seen in Fig. 6 to form the bearing flanges. Where the collecting electrodes are to be grounded, as is usually the case, the discharge electrodes must, necessarily, be electrically insulated, and for efficient service in such wise that every discharge terminal of the electrode is maintained at a fixed distance from the opposed collecting electrode, this fixed distance to be the same for all discharge electrodes of this system. As the nature of gaseous bodies commonly found in commercial plants, prohibits the supporting of such insulator within the limits of the gaseous body, suitable supports must be provided outside the flue or chamber confining the gaseous body, where the insulation may be kept clear and dry. For this purpose the bus bars 8 (Fig. 6) resting upon the insulators 9 must pass through holes in the walls of the flue or chamber, these holes to be sufficiently large to allow clearance between the bus bar and wall so that there will be no electrical arcing or shorting at this point. When such holes interfere with the working draft, they must be closed without injuring the bus bar insulation. This may be done as shown in Fig. 7.

10 is a tube covering the hole outside the flue, said tube being of material dependent upon conditions at the flue and concentric or nearly so with axis of the bus bar 8, passing through the hole. The outer opening of the tube is closed by a disk or cone 11 of any suitable insulating material, such as mica, glass, etc., which fits snugly around the bus bar and closely against the tube. When the gaseous body is dry, or the draft of the flue sufficiently high, a few small holes in the insulating disk or cone 11 admit sufficient air from the outside, to prevent any of the gaseous body depositing upon the insulation. In many cases, however, where portions of the gaseous body may deposit upon the insulating disk or cone, suspended particles therein are prevented from entering tube 10 by the device shown in Fig. 8, wherein the inner end of the tube 10 is seen, and B is a "discharge electrode" fitted around the bus bar 8, outside the line of the flue wall, thus slightly within the tube's boundaries. The inner end of the tube thus becomes a collecting electrode opposed to discharge electrode B, and the field established tends to keep the outer end of the tube free from all suspended particles. In Fig. 6 is shown discharge electrode B, keyed or otherwise fastened to bus bars 12 securely at the top. This method has proved entirely satisfactory. These bars 12 in turn are supported by bars 13 which run parallel to the flue walls. The bars 13 may be held upon horizontal bars 8, which pass through the side walls of the flue and rest upon insulators 9 outside of the flue.

In Fig. 6, 14 represents a baffling block to prevent the gas passing behind the collecting electrode A resting against it, this space being too narrow to admit a discharge electrode A. The dead space filled by block 14 occurs by virtue of the "staggered" arrangement in each row of electrodes, and with consecutive rows is alternately at opposite sides of the flue.

Having thus described our invention what we claim as new and desire to secure by Letters Patent is:—

1. In an apparatus for separating suspended particles from gaseous bodies by the application of electric charges, discharge electrodes consisting of mica sheets secured to an electrically conductive supporting structure in such wise that the mica edges protrude from the supporting structure.

2. In an apparatus for separating suspended particles from gaseous bodies by the application of electric charges, discharge electrodes consisting of mica sheets with serrated edges, secured to an electrically conductive supporting structure, in such wise that the mica serrations protrude from the supporting structure.

3. In an apparatus for separating suspended particles from gaseous bodies by the application of electric charges, discharge electrodes composed of mica sheets secured to an electrically conductive supporting structure in such wise that the mica edges protrude from the supporting structure, in combination with collecting electrodes opposed to said discharge electrodes as terminals of an electric field.

4. In an apparatus for separating suspended particles from gaseous bodies by the application of electric charges, discharge electrodes consisting of mica sheets with serrated edges, secured to an electrically conductive supporting structure, in such wise that the mica serrations protrude from the supporting structure, in combination with collecting electrodes opposed to said discharge electrodes as terminals of an electric field.

5. In an apparatus for separating suspended particles from gaseous bodies by the application of electric charges, discharge electrodes consisting of composite mica sheets secured to an electrically conductive supporting structure in such wise that the mica edges protrude from the supporting structures, the cementing substance of said mica sheet being removed from its protruding edges.

6. In an apparatus for separating suspended particles from gaseous bodies by the application of electric charges, a plurality of plates, serving as collecting electrodes, arranged at equal intervals from one another in successive rows across the gas-carrying flue, the plane of each individual plate being substantially parallel to the direction of travel of the gases and the successive rows of plates being disposed lengthwise of the flue, the plates in each row being opposite the spaces between the plates of the adjacent rows, and discharge electrodes situated between each pair of collecting electrodes in the individual rows.

7. In an apparatus for separating suspended particles from gaseous bodies by the application of electric charges, the combination of a system of field electrodes in a flue or chamber through which the gaseous body flows; a supporting conductive frame for said electrodes, part of said frame passing outwardly through an opening in the flue or chamber wall, and supported exteriorly upon electric insulators, and means for insulating said outwardly extending part in its wall opening consisting of a tube fitting and passing through the opening, and freely surrounding said extending part, and an insulating cover for the outer end of said tube.

8. In an apparatus for separating suspended particles from gaseous bodies by the application of electric charges, the combination of a system of field electrodes in a flue or chamber through which the gaseous body flows; a supporting conductive frame for said electrodes, part of said frame passing outwardly through an opening in the flue or chamber wall, and supported exteriorly upon electric insulators, and means for insulating said outwardly extending part in its wall opening consisting of a tube fitting and passing through the opening, and freely surrounding said extending part and a discharge electrode fitted on the frame inside the opening and forming with the opposing inner end of the tube an electric field.

In testimony whereof we have signed our names to this specification in the presence of two subscribing witnesses.

FREDERICK GARDNER COTTRELL.
HERBERT ALEXANDER BURNS.

Witnesses:
WM. F. BOOTH,
D. B. RICHARDS.